(12) United States Patent
Sheppard et al.

(10) Patent No.: US 7,783,917 B2
(45) Date of Patent: Aug. 24, 2010

(54) SELECTION OF DATA ARRAYS

(75) Inventors: Jacob Lee Sheppard, Gilbert, AZ (US); Robert Akira Kubo, Tucson, AZ (US); Kurt Allen Lovrien, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 11/679,118

(22) Filed: Feb. 26, 2007

(65) Prior Publication Data
US 2008/0209253 A1 Aug. 28, 2008

(51) Int. Cl.
*G06F 11/00* (2006.01)
(52) U.S. Cl. .................................. 714/6; 714/7; 714/8
(58) Field of Classification Search ................. 714/5–8, 714/42
See application file for complete search history.

(56) References Cited

U.S. PATENT DOCUMENTS

| | | | |
|---|---|---|---|
| 6,418,539 B1 | 7/2002 | Walker | |
| 6,571,354 B1 * | 5/2003 | Parks et al. | 714/7 |
| 6,578,158 B1 | 6/2003 | Deitz et al. | |
| 6,718,434 B2 * | 4/2004 | Veitch et al. | 711/114 |
| 7,047,450 B2 | 5/2006 | Iwamitsu et al. | |
| 7,127,555 B2 * | 10/2006 | Takeda et al. | 711/111 |
| 2004/0153606 A1 * | 8/2004 | Schott | 711/114 |
| 2005/0044313 A1 * | 2/2005 | Amemiya et al. | 711/114 |
| 2005/0246579 A1 * | 11/2005 | Rust et al. | 714/11 |

OTHER PUBLICATIONS

Wilkes, et al., "The HP AutoRAID Hierarchical Storage System", ACM, 1995, pp. 96-107.
U.S. Application entitled "Method, System, and Program for Storing and Using Metadata in Multiple Storage Locations", U.S. Appl. No. 10/991,664, filed Nov. 17, 2004 by inventors R.R. Frondozo, K.A. Lovrien, R.A. Ripberger, J.L. Sheppard and M.P. Vageline.

* cited by examiner

*Primary Examiner*—Bryce P Bonzo
(74) *Attorney, Agent, or Firm*—Rabindranath Dutta; Konrad Raynes & Victor LLP

(57) ABSTRACT

Provided are a method, system, and article of manufacture, wherein a plurality of data arrays coupled to a storage controller is maintained. Data arrays are selected from the plurality of data arrays based on predetermined selection rules. Data is stored redundantly in the selected data arrays by writing the data to the selected data arrays.

20 Claims, 8 Drawing Sheets

| Tier | Raid Type | Rank Detail State | Raid 6 Full State |
|---|---|---|---|
| 1 | Raid 10<br>Raid 6<br>Raid 5 | GOOD<br>GOOD<br>GOOD | NA<br>GGG<br>NA |
| 2 | Raid 10<br>Raid 6<br>Raid 5 | REBUILDING<br>REBUILDING<br>REBUILDING | NA<br>RGG<br>NA |
| 3 | Raid 6 | REBUILDING | RRG, III, RII, RRI |
| 4 | Raid 10<br>Raid 6<br>Raid 5 | EXPOSED<br>EXPOSED<br>EXPOSED | NA<br>XGG<br>NA |
| 5 | Raid 6<br>Raid 6 | EXPOSED<br>REBUILDING | XXG, XRG XII, XXI, XRI<br>PPP |
| 6 | Raid 10<br>Raid 6 | DEGRADED<br>DEGRADED | NA<br>ZGG |
| 7 | Raid 6 | DEGRADED | ZRG, ZXG, ZII, ZRI, ZXI |

Legend (for the Full States)

G - Good. Disk component is online. Not rebuilding, initializing or rebuilding parity.

I - Initializing. A newly added disk component is online for reads and writes while being formatted in the background.

R - Rebuilding. Disk component is being written to with data from data / parity calculations based on the other disks in the array.

X - Missing. Disk component is temporarily not visible to adapter.

Z - Deconfigured. Disk component is rejected from the array.

P - Parity Rebuilding. The array's parity is being rebuilt after array metadata from both owning adapters is lost.

NA - Not Applicable

FIG. 5

SELECTION OF DATA ARRAYS

BACKGROUND

1. Field

The disclosure relates to a method, system, and article of manufacture for the selection of data arrays.

2. Background

In certain computing environments, a host system may communicate a request to a control unit, such as an IBM* Enterprise Storage Server* (ESS), for data in a storage device managed by the ESS, where the ESS may provide access to storage devices, such as interconnected hard disk drives through one or more logical paths. The interconnected hard disk drives may be configured as a Direct Access Storage Device (DASD), Redundant Array of Independent Disks (RAID), Just a Bunch of Disks (JBOD), etc. The control unit may maintain critical system metadata in local storage, where in certain situations the critical system metadata may be needed to determine the configuration of the system. If the critical system metadata is corrupted, invalid or unavailable, then the control unit may fail and may have to be reconfigured. The critical system metadata may be hidden from the host system and may only be available to the operating system of the control unit.

*IBM and Enterprise Storage Server are trademarks or registered trademarks of IBM Corporation.

SUMMARY OF THE PREFERRED EMBODIMENTS

Provided are a method, system, and article of manufacture, wherein a plurality of data arrays coupled to a storage controller is maintained. Data arrays are selected from the plurality of data arrays based on predetermined selected rules. Data is stored redundantly in the selected data arrays by writing the data to the selected data arrays.

In certain embodiments, the data arrays are RAID arrays, wherein the selecting of the data arrays from the plurality of data arrays further comprises selecting three RAID arrays from the plurality of RAID arrays based on the predetermined selection rules, in response to determining that the plurality of RAID arrays has more than three RAID arrays.

In additional embodiments, if a first RAID array is in a better rank detail state than a second RAID array then the first RAID array is selected in preference to the second RAID array for storing the data redundantly, wherein good rank detail states are better than rebuilding rank detail states, wherein rebuilding rank detail states are better than exposed rank detail states, and wherein exposed rank detail states are better than degraded rank detail states.

In further embodiments, a plurality of dual loops couple the plurality of RAID arrays to the storage controller, wherein a selected first RAID array is preferred to be in a different dual loop than a selected second RAID array.

In yet further embodiments, the predetermined selection rules used for selecting the RAID arrays are based on a weighting of the reliability and the performance of drive types of the plurality of RAID arrays, wherein if a first RAID array is better than a second RAID array based on the weighting, then the first RAID is selected in preference to the second RAID array for storing the data redundantly.

BRIEF DESCRIPTION OF THE DRAWINGS

Referring now to the drawings in which like reference numbers represent corresponding parts throughout:

FIG. 5 illustrates a block diagram that shows the impact of RAID type, rank detail state, and RAID 6 full states on the selection of RAID arrays, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Figure 1:
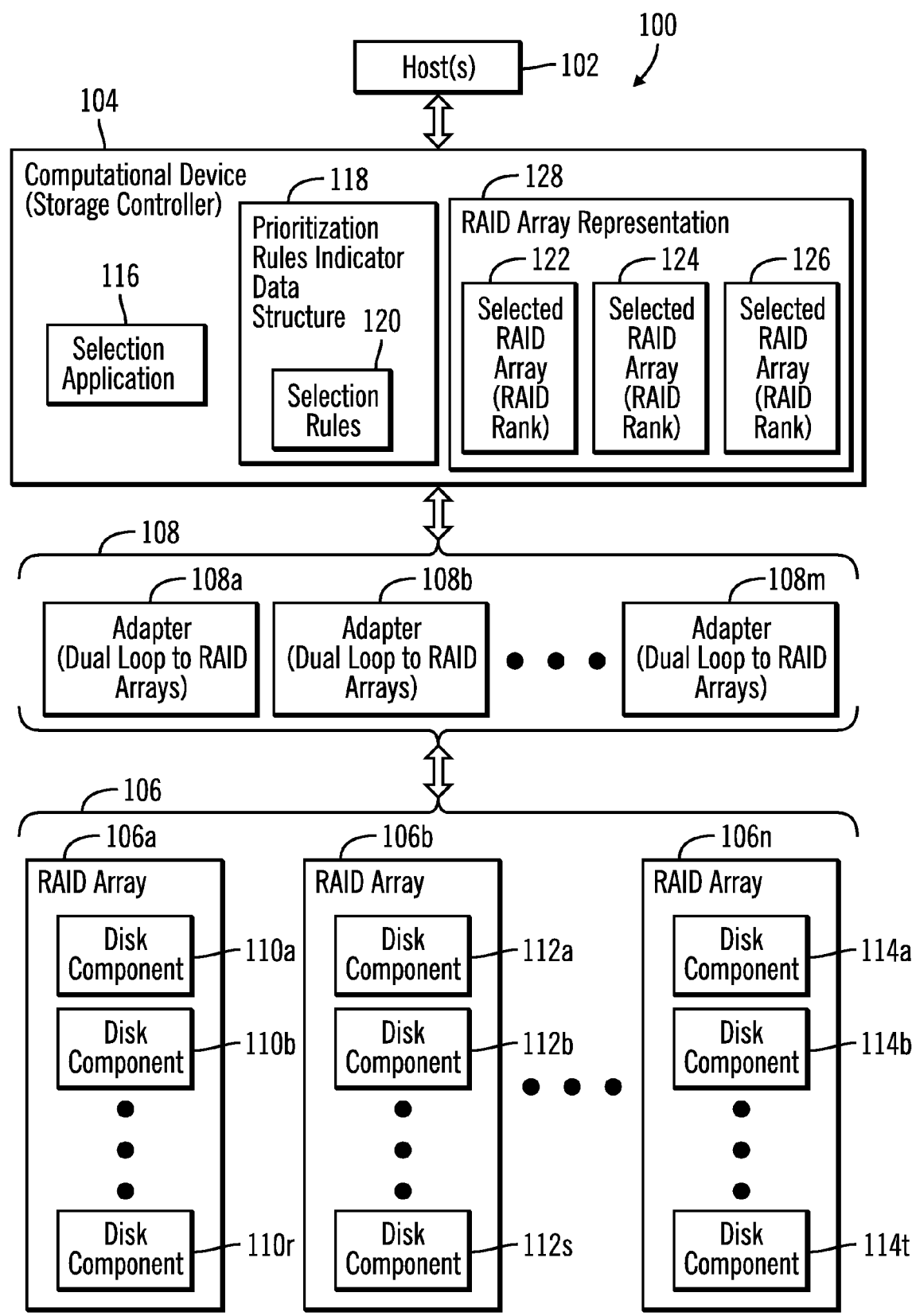
FIG. 1 illustrates a block diagram of a computing environment, in accordance with certain embodiments.

FIG. 1 illustrates a block diagram of a computing environment 100, in accordance with certain embodiments. One or more hosts 102 communicate Input/Output (I/O) requests to a storage controller 104 that is coupled to a plurality of data arrays, such as RAID arrays 106, via a plurality of adapters 108. In FIG. 1, the RAID arrays 106 are also indicated via reference numerals 106a, 106b, . . . 106n, and the plurality of adapters 108 are also indicated via reference numerals 108a, 108b, . . . 108m.

The storage controller 104 may comprise any suitable computational device known in the art, such as an Enterprise Storage Server, a personal computer, a workstation, a server, a mainframe, a hand held computer, a palm top computer, a telephony device, network appliance, etc. While FIG. 1 shows that the plurality of data arrays are RAID arrays 106, in alternative embodiments the data arrays may comprise any suitable storage devices known in the art, where the suitable storage devices may be configured in other configurations such as DASD, JBOD, etc., that are different from RAID.

The host 102 may communicate with the storage controller 104 over a network (not shown), such as a Local Area Network (LAN), a Storage Area Network (SAN), a Wide Area Network (WAN), a wireless network, etc. Alternatively, the host 102 may communicate with the storage controller 104 over a bus interface, such as a Peripheral Component Interconnect (PCI) bus or a serial interface. The plurality of adapters 108 may create dual loops coupling the RAID arrays 106 to the storage controller 104.

Each of the plurality of RAID arrays 106a . . . 106n may include one or more disk components. For example, the RAID array 106a may include disk components 110a, 110b, . . . , 110r, the RAID array 106b may include disk components 112a, 112b, . . . , 112s, and the RAID array 106n may include disk components 114a, 114b, . . . 114t. Each disk component may comprise a data disk, a parity disk, or any other type of disk or component.

In certain embodiments, a selection application 116 included in the computational device 104 may select RAID arrays from the plurality of RAID arrays 106a, . . . 116n, wherein certain embodiments the selected RAID arrays may be used to store data, such as, critical system metadata. The critical system metadata may be stored redundantly in the selected RAID arrays. The selection application 116 uses a prioritization rules data structure 118 that includes selection rules 120 to determine which RAID arrays to select from the plurality of RAID arrays 106a . . . 106n in order to store the critical system metadata. In FIG. 1, the selection application 116 selects three RAID arrays from the plurality of RAID arrays 106a . . . 106n and the logical representation of these three selected RAID arrays 122, 124, 126 are included in the data structure referred to as RAID array representations 128. While in FIG. 1 three RAID arrays have been selected from the plurality of RAID arrays 106a . . . 106n for storing the critical system metadata, in alternative embodiments a fewer number of RAID arrays may be selected for storing the critical system metadata. The RAID arrays may also be referred to as RAID ranks.

The three selected RAID arrays 122, 124, 126 can be used to store the critical system metadata redundantly. For example, in certain embodiments the critical system metadata may be mirrored in each of three selected RAID arrays 122, 124, 126. While in certain embodiments the data stored in the three selected RAID arrays 122, 124, 126 include critical system metadata, in alternative embodiments other types of data or metadata may be stored in the three selected RAID arrays.

In certain embodiments illustrated in FIG. 1, the selection rules 120 may be based on the RAID array states of the RAID arrays 106a . . . 106n, the RAID array types of the RAID arrays 106a . . . 106n, and the adapter pair connections between the storage controller 104 and the RAID arrays 106a . . . 106n maintained via the adapters 108a . . . 108m. The selection application 116 uses the selection rules 120 to determine the three selected RAID arrays from the plurality of RAID arrays 106a . . . 106n to store the critical system metadata. By limiting the number of selected RAID arrays to three the selection application ensures that the storage controller 104 operates at a desirable level of performance, while providing redundancy to the system critical metadata. If more than three RAID arrays were selected the performance impact on the storage controller 104 may be greater.

Figure 2:
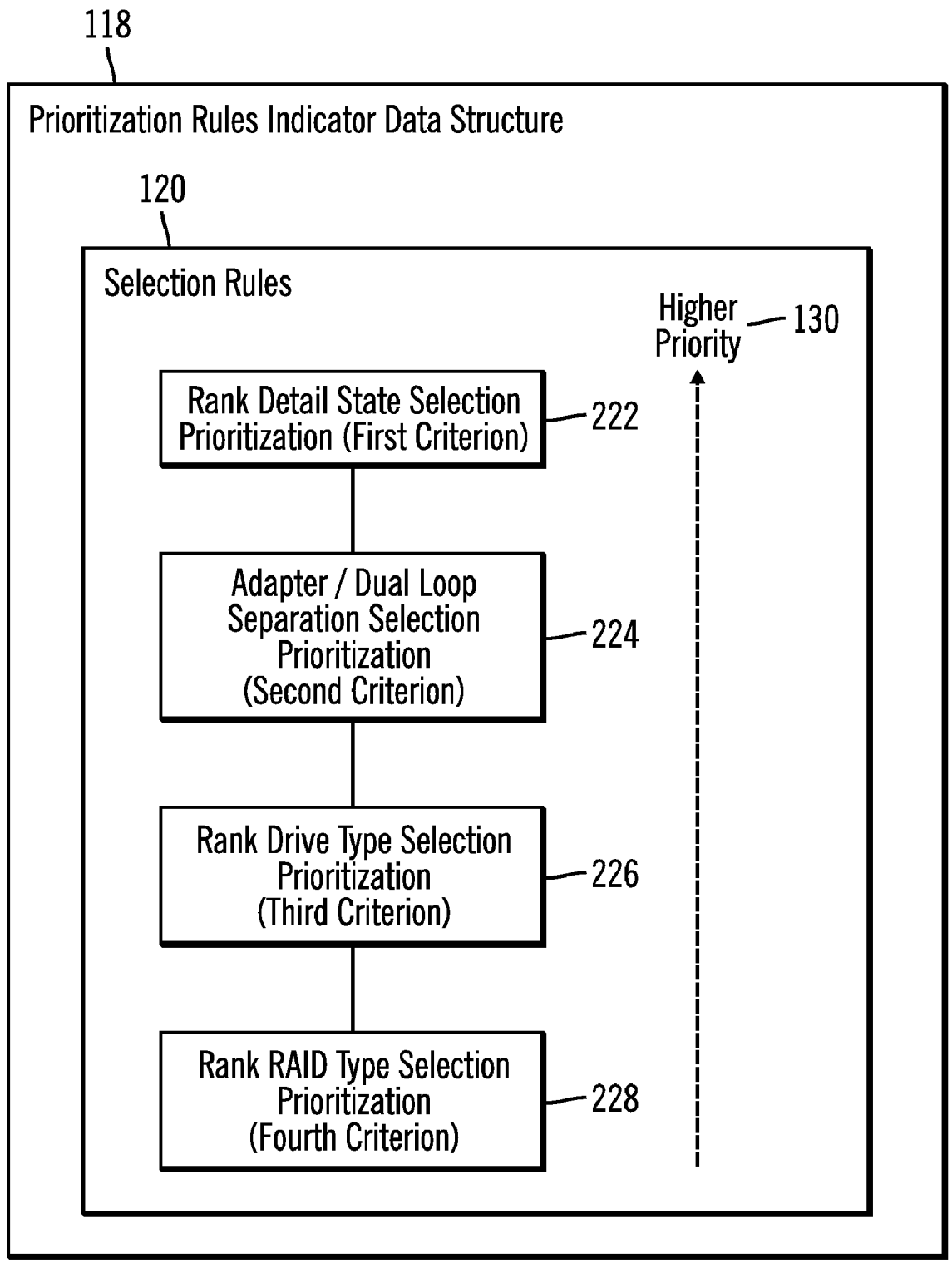
FIG. 2 illustrates a block diagram that shows a prioritization rules indicator data structure, in accordance with certain embodiments.

FIG. 2 illustrates a block diagram that shows a prioritization rules indicator data structure 118 implemented in storage controller 104 of the computing environment 100, in accordance with certain embodiments.

The selection rules 120 include data structures corresponding to a rank detail state selection prioritization 122, an adapter/dual-loop separation selection prioritization 124, a rank drive type selection prioritization 126, and a rank RAID type selection prioritization 128.

In certain embodiments in which the number of RAID arrays 106a . . . 106n is greater than three, the selection application 116 may select three RAID arrays that have the best characteristics in terms of performance and reliability based on the selection rules 120 included in the prioritization rules data structure 118. The selected RAID arrays 122, 124, 126 are based on a combination of the following four criteria, in the following decreasing order or importance (as indicated by reference numeral 130 in FIG. 2):

1) Rank detail state selection prioritization (First criterion) 122;

2) Adapter/Dual-loop separation selection prioritization (Second criterion) 124;

3) Rank drive type selection prioritization (Third criterion) 126; and

4) Rank RAID type selection prioritization (Fourth criterion) 128;

When the selection application 116 considers a new RAID array to replace one of the previously selected RAID arrays (where the previously selected RAID drives may potentially be used to store critical system metadata), the selection application 116 may consider the four criteria in the order provided above. If a new RAID array is more suitable for storing critical system metadata than a previously selected RAID array, the new RAID array may be selected over the previously selected RAID array, whereas if the new RAID array is less suitable then the new RAID array is rejected. If the new RAID array and the previously selected RAID array are equally suitable according to one criterion, then the new RAID array and the previously selected RAID array are compared for selection according to the next criterion.

Therefore, FIG. 2 illustrates certain embodiments in which the various selection rules 122, 124, 126, 128 have different priorities and the selection application 116 may use selection rules with a higher priority over selection rules with a lower priority in order to select the RAID arrays 122, 124, 128 for storing critical system metadata.

Figure 3:
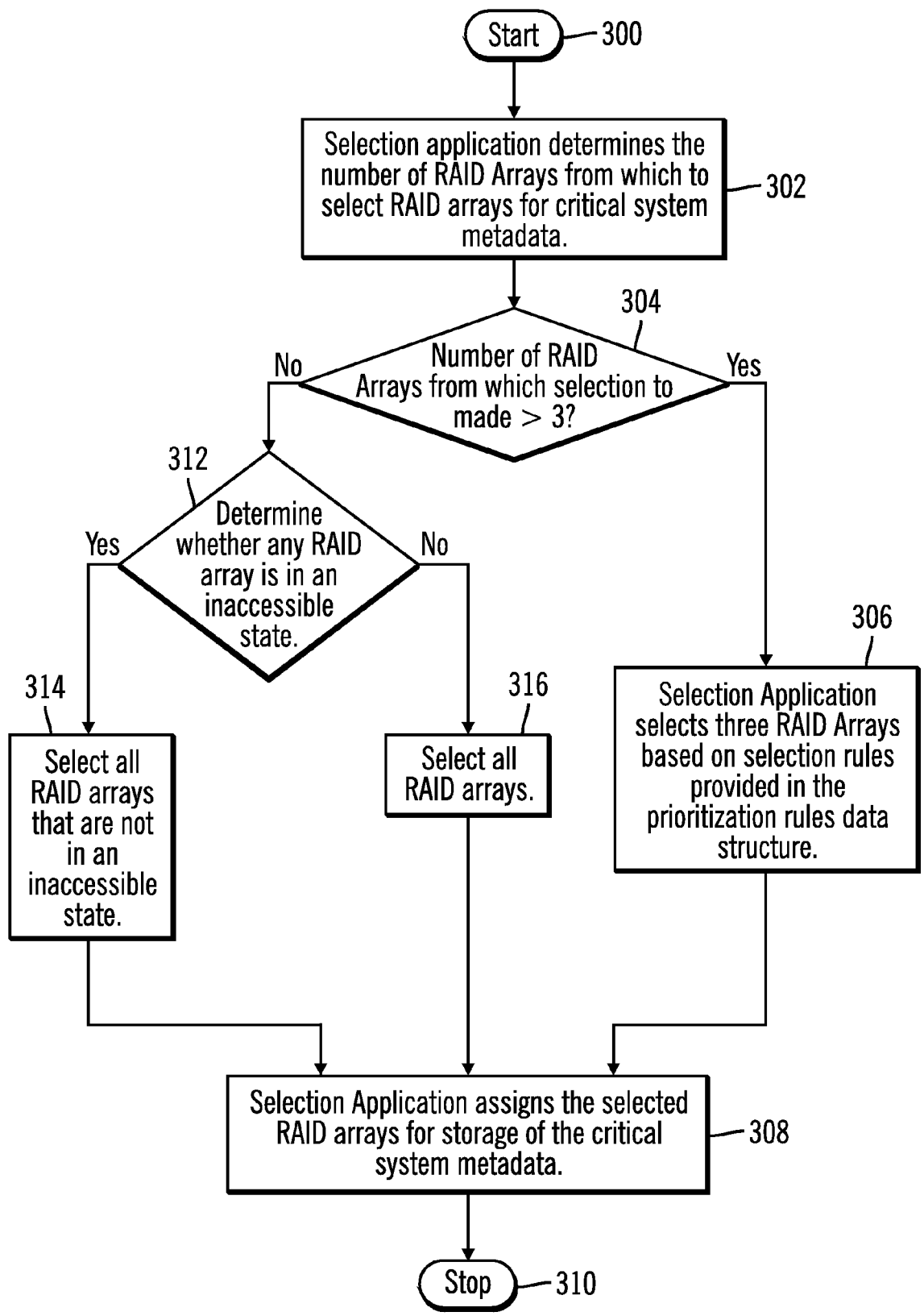
FIG. 3 illustrates operations for the selection of data arrays, in accordance with certain embodiments.

FIG. 3 illustrates operations for the selection of RAID arrays, in accordance with certain embodiments. The operations may be performed by the selection application 116 implemented in the storage controller 104.

Control starts at block 300 and continues to block 302 where the selection application 116 determines the number of RAID Arrays in the plurality of RAID arrays 106a . . . 106n from which to select RAID arrays for storing critical system metadata.

Control proceeds to block 304 where the selection application 116 determines whether the number of RAID arrays from which the selection is to be made is greater than three. If so, then the selection application 116 selects (at block 306) three RAID arrays based on selection rules provided in the prioritization rules data structure 118. The selection application assigns (at block 308) the selected RAID arrays for the storage of the critical system metadata and the process stops (at block 310).

If a block 304, the selection application 116 determines that the number of RAID arrays from which the selection is to be made is not greater than three, then control proceeds to block 312. At block 312, the selection application 116 determines whether any RAID array is in an inaccessible state. If so, then all RAID arrays that are not in an inaccessible state are selected (at block 314) for storing the critical system metadata. If not, then all RAID arrays (three or less in number) are selected (at block 316) for storing the critical system metadata. Control proceeds to block 308 from block 314 and 316.

Therefore, FIG. 3 illustrates at least one embodiment in which at most three RAID arrays are selected from a plurality of RAID arrays based on selection rules 120 provided in a prioritization rules indicator data structure 118, wherein the at most three RAID arrays are used for storing critical system metadata.

Figure 4:
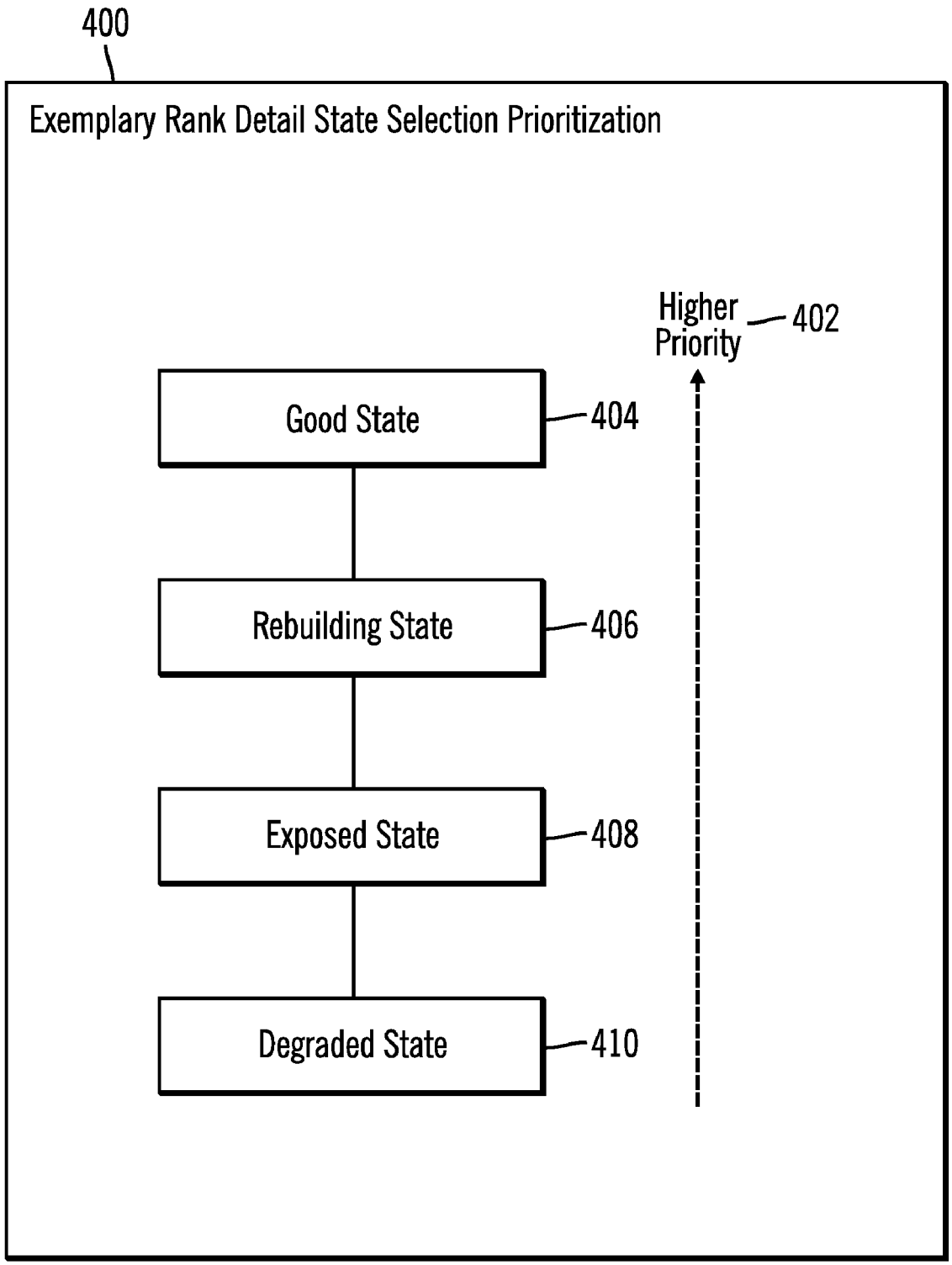
FIG. 4 illustrates a block diagram that shows an exemplary prioritization based on rank detail states, in accordance with certain embodiments.

FIG. 4 illustrates a block diagram that shows an exemplary prioritization based on rank detail states, in accordance with certain embodiments. The exemplary prioritization illustrated in FIG. 4 may be implemented in the selection rules 120 of the prioritization rules indicator data structure 118.

The exemplary rank detail state selection prioritization 400 of FIG. 4 shows the following:

1) A higher priority (reference numeral 402) for selection is indicated for RAID ranks that are in a good state 404 over RAID ranks that are in a rebuilding state 406;

2) A higher priority (reference numeral 402) for selection is indicated for RAID ranks that are in a rebuilding state 406 over RAID ranks that are in an exposed state 408; and 3) A higher priority (reference numeral 402) for selection is indicated for RAID ranks that are in an exposed state 408 over RAID ranks that are in a degraded state 410.

FIG. 4 illustrates, that in order for a new RAID rank to replace one of the three existing RAID ranks, the new rank's detail state should be better than each of the three existing RAID ranks. Acceptable rank detail states in decreasing order of desirability are good, rebuilding, exposed and degraded. Not all rank detail states are available for all RAID arrays. For example, the degraded state may be for only RAID 6 and RAID 10 ranks.

FIG. 5 illustrates a block diagram 500 that shows the impact of RAID type, Rank detail state, and RAID 6 full states on the selection of RAID arrays, in accordance with certain embodiments. The abbreviations G, I, R, X, Z, P, and NA for the RAID 6 full states 502 used in the block diagram 500 are described in the legend 504 provided in FIG. 6.

Figure 6:
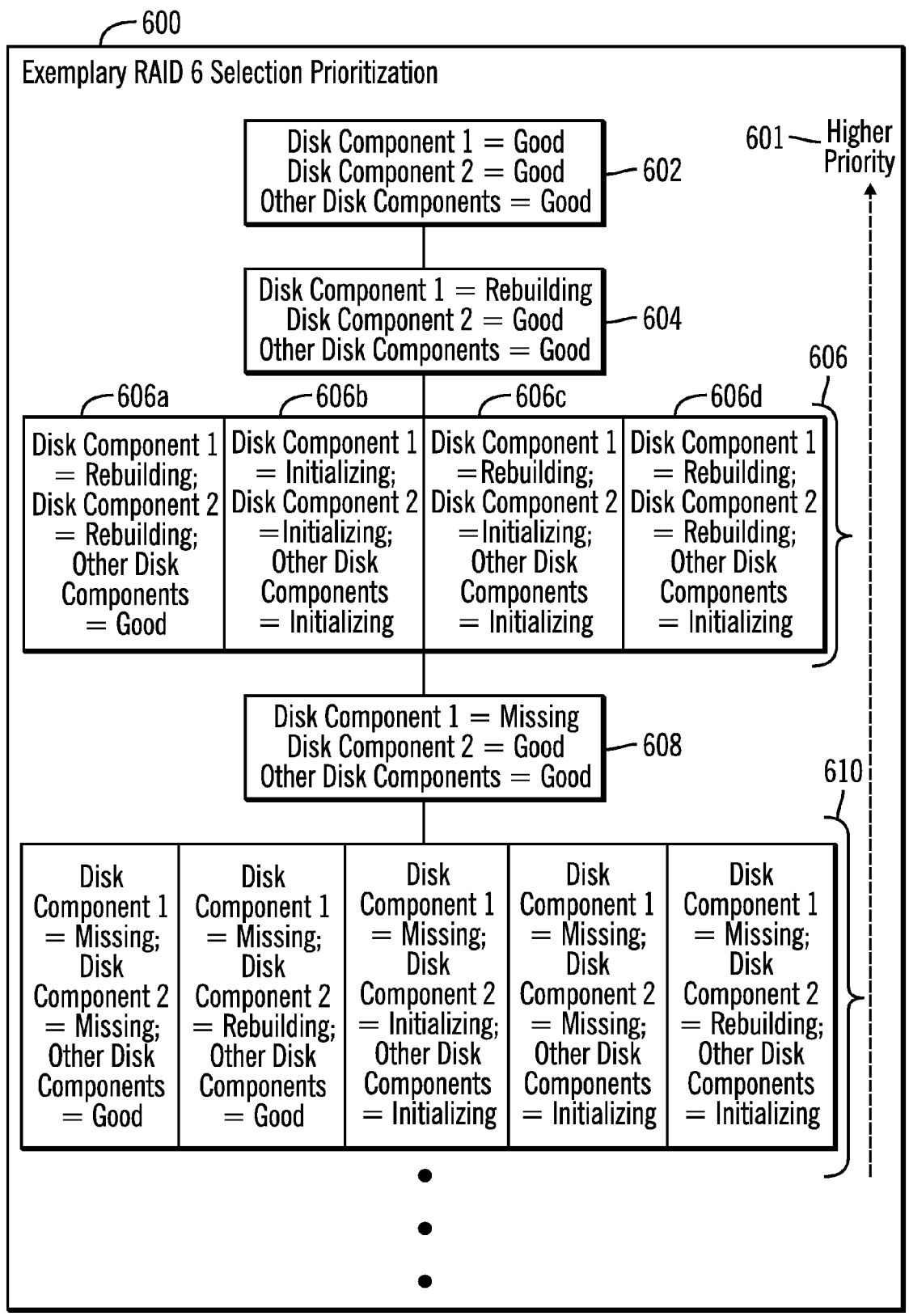
FIG. 6 illustrates a block diagram that shows an exemplary prioritization for RAID 6, in accordance with certain embodiments.

FIG. 5 shows how RAID 6 array full states affect the selection of the three RAID arrays when compared to other RAID types and the rank detail states of the other RAID types. In FIG. 6, ranks better for storing critical system metadata have lower tier numbers. For example, tier 1 (reference numeral 506) is preferred over tier 2 (reference numeral 508), tier 2 is preferred over tier 3 (reference numeral 510) and so on.

FIG. 6 illustrates a block diagram 600 that shows an exemplary prioritization for RAID 6 to be used in the prioritization rules data structure 118, in accordance with certain embodiments.

In FIG. 6, the prioritization order 601 is based on the state of disk components 110a ... 110r, 112a ... 112s, 114a ... 114t of the RAID arrays 106a ... 106n. While reference numerals 602, 604, 606, 608, 610 indicated in FIG. 6 show a certain set of ordering for certain embodiments, other additional orderings associated with other disk component states that are of a lower priority are not indicated. It can be seen from FIG. 6, that certain combinations of disk components such as 606a, 606b, 606c, 606d may have the same priority for selection.

Figure 7:
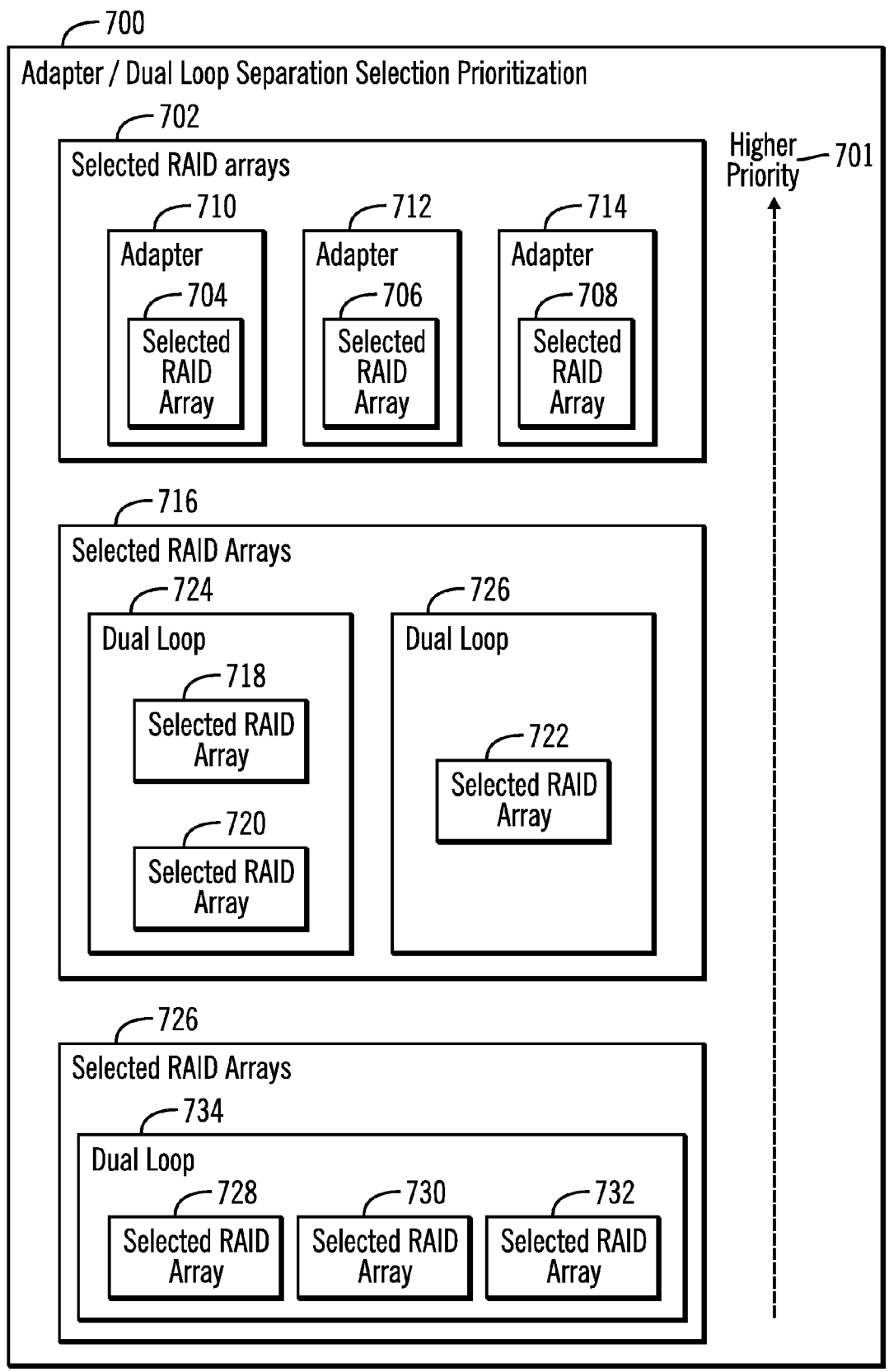
FIG. 7 illustrates a block diagram that shows the selection of RAID arrays based on the configuration of adapters and dual loops, in accordance with certain embodiments.

FIG. 7 illustrates a block diagram 700 that shows the selection of RAID arrays based on the configuration of adapters and dual loops, in accordance with certain embodiments. In FIG. 7 the priority order of the selected RAID arrays is shown by the "higher priority" indication (reference numeral 701)

In FIG. 7, the highest preference is for the case (reference numeral 702) in which the selected RAID arrays 704, 706, 708 are coupled by difference adapters 710, 712, 714 to the storage controller 104. The next highest priority is for the case (reference numeral 716) where the selected RAID arrays 718, 720, 722 are spread between two different dual loops 724, 726 that couple the selected RAID arrays 718, 720, 722 to the storage controller 104. The lowest priority is for the case (reference numeral 726) where the selected RAID arrays 728, 730, and 732 are in the same dual loop 734 coupling the selected RAID arrays 728, 730, 732 to the storage controller 104.

As illustrated in FIG. 7, in certain embodiments, the selection application 104 may replace one of the three existing RAID ranks with a new rank if adding the new rank increases the current number of adapter pairs that couple the RAID ranks to the storage controller 104. Adapter pair separation is weighted higher than RAID types and drive type but lower than rank detail state.

Certain computers may have only a single adapter pair and data arrays may be contained within dual loops. The selection application 104 may use dual loop information to ensure that in such computer, one of the RAID ranks is on one dual loop 726 and the other two RAID ranks are on the other dual loop 724.

In certain embodiments, the supported RAID rank types, in order of preference for selecting RAID ranks for storing critical system metadata are RAID 10, RAID 6, and RAID 5. The selection application 104 may replace an existing RAID rank if a new RAID rank has better RAID type. RAID 6 arrays are generally more reliable than RAID 10 arrays because RAID 6 arrays can survive any two drive failures, while failure of two mirrored drives in a RAID 10 array may result in data loss. Even so, RAID 10 arrays are still preferred over RAID 6 ranks, since there are 3 mirrored. RAID ranks in the system, giving more than adequate redundancy, and because RAID 10 arrays have superior performance in comparison to RAID 6 ranks. Therefore, in certain embodiments the predetermined selection rules used for selecting the RAID arrays are based on a weighting of the reliability and the performance of drive types of the plurality of RAID arrays, wherein if a first RAID array is better than a second RAID array based on the weighting, then the first RAID array is selected in preference to the second RAID array for storing the data redundantly.

Certain embodiments allow the storage of critical system metadata on RAID 6 type arrays, which provide better redundancy than RAID 5 type arrays. Certain embodiments reduce the chance of data loss by storing at least two of the three copies of the critical system metadata on separate dual-loops. Certain embodiments move the critical system metadata to RAID arrays in the system made up of the best drive types.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize the many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program produce accessible from a computer usable or computer readable medium providing program code for use by or in connection with a computer or any instruction execution system. For the purpose of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
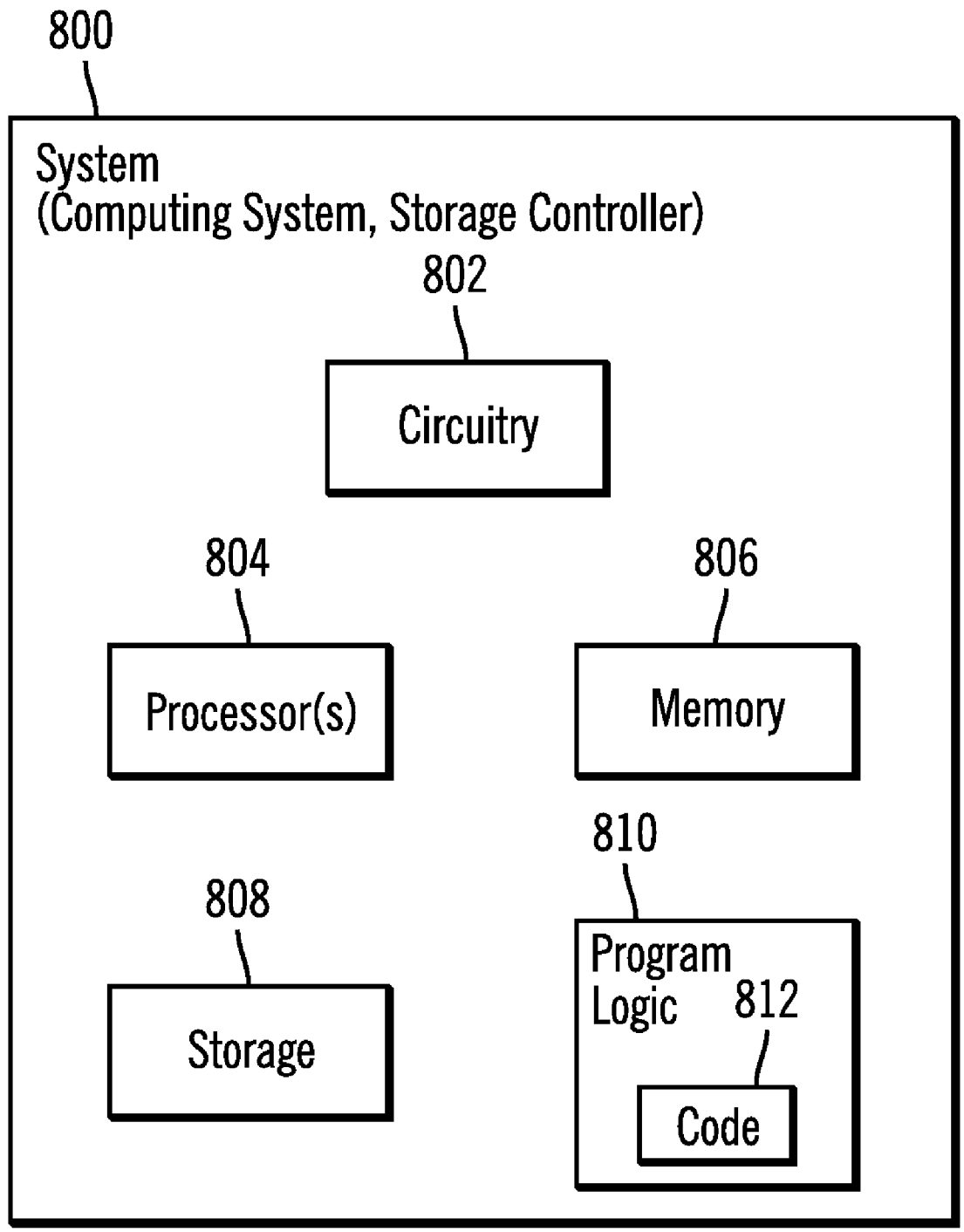
FIG. 8 illustrates a block diagram of a computer architecture in which certain described aspects of the embodiments are implemented.

FIG. 8 illustrates the architecture of computing system 800, wherein in certain embodiments the storage controller 104 of the computing environment 100 of FIG. 1 may be implemented in accordance with the architecture of the computing system 800. The computing system 800 may also be referred to a system, and may include a circuitry 802 that may in certain embodiments include a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

maintaining a plurality of RAID arrays coupled to a storage controller;

selecting RAID arrays from the plurality of RAID arrays based on predetermined selection rules; and storing data redundantly in the selected RAID arrays by writing the data to the selected RAID arrays, wherein if a first RAID array of the plurality of RAID arrays is in a better rank detail state than a second RAID array of the plurality of RAID arrays then the first RAID array is selected in preference to the second RAID array for storing the data redundantly, wherein good rank detail states are better than rebuilding rank detail states, wherein rebuilding rank detail states are better than exposed rank detail states, and wherein exposed rank detail states are better than degraded rank detail states.

2. The method of claim 1, wherein the selecting of the RAID arrays from the plurality of RAID arrays further comprises:

selecting three RAID arrays from the plurality of RAID arrays based on the predetermined selection rules, in response to determining that the plurality of RAID arrays has more than three RAID arrays.

3. The method of claim 2, wherein a plurality of dual loops couple the plurality of RAID arrays to the storage controller, wherein a selected first RAID array is preferred to be in a different dual loop than a selected second RAID array.

4. The method of claim 2, wherein the predetermined selection rules used for selecting the RAID arrays are based on a weighting of the reliability and the performance of drive types of the plurality of RAID arrays, wherein if the first RAID array is better than the second RAID array based on the weighting, then the first RAID array is selected in preference to the second RAID array for storing the data redundantly.

5. The method of claim 1, wherein while selecting the RAID arrays from the plurality of RAID arrays based on the predetermined selection rules:

a rank detail state selection prioritization criterion is provided a higher priority in the predetermined selection rules than a dual loop separation selection prioritization criterion;

the dual loop separation selection prioritization criterion is provided a higher priority in the predetermined selection rules than a rank drive type selection prioritization criterion; and the rank drive type selection prioritization criterion is provided a higher priority in the predetermined selection rules than a rank RAID type selection prioritization criterion.

6. A storage controller in communication with a plurality of RAID arrays, the storage controller comprising:

memory; and processor, coupled to the memory, wherein the processor executes operations, the operations comprising:

(i) selecting RAID arrays from the plurality of RAID arrays based on predetermined selection rules; and (ii) storing data redundantly in the selected RAID arrays by writing the data to the selected RAID arrays, wherein if a first RAID array of the plurality of RAID arrays is in a better rank detail state than a second RAID array of the plurality of RAID arrays then the first RAID array is selected in preference to the second RAID array for storing the data redundantly, wherein good rank detail states are better than rebuilding rank detail states, wherein rebuilding rank detail states are better than exposed rank detail states, and wherein exposed rank detail states are better than degraded rank detail states.

7. The storage controller of claim 6, wherein the selecting of the RAID arrays from the plurality of RAID arrays further comprises:

selecting three RAID arrays from the plurality of RAID arrays based on the predetermined selection rules, in response to determining that the plurality of RAID arrays has more than three RAID arrays.

8. The storage controller of claim 7, wherein a plurality of dual loops couple the plurality of RAID arrays to the storage controller, wherein a selected first RAID array is preferred to be in a different dual loop than a selected second RAID array.

9. The storage controller of claim 7, wherein the predetermined selection rules used for selecting the RAID arrays are based on a weighting of the reliability and the performance of drive types of the plurality of RAID arrays, wherein if the first RAID array is better than the second RAID array based on the weighting, then the first RAID array is selected in preference to the second RAID array for storing the data redundantly.

10. The storage controller of claim 6, wherein while selecting the RAID arrays from the plurality of RAID arrays based on the predetermined selection rules:

a rank detail state selection prioritization criterion is provided a higher priority in the predetermined selection rules than a dual loop separation selection prioritization criterion;

the dual loop separation selection prioritization criterion is provided a higher priority in the predetermined selection rules than a rank drive type selection prioritization criterion; and the rank drive type selection prioritization criterion is provided a higher priority in the predetermined selection rules than a rank RAID type selection prioritization criterion.

11. An article of manufacture including code, wherein the code performs operations on a computer, the operations comprising:

maintaining a plurality of RAID arrays coupled to a storage controller;

selecting RAID arrays from the plurality of RAID arrays based on predetermined selection rules; and storing data redundantly in the selected RAID arrays by writing the data to the selected RAID arrays, wherein if a first RAID array of the plurality of RAID arrays is in a better rank detail state than a second RAID array of the plurality of RAID arrays then the first RAID array is selected in preference to the second RAID array for storing the data redundantly, wherein good rank detail states are better than rebuilding rank detail states, wherein rebuilding rank detail states are better than exposed rank detail states, and wherein exposed rank detail states are better than degraded rank detail states.

12. The article of manufacture of claim 11, wherein the selecting of the RAID arrays from the plurality of RAID arrays further comprises:

selecting three RAID arrays from the plurality of RAID arrays based on the predetermined selection rules, in response to determining that the plurality of RAID arrays has more than three RAID arrays.

13. The article of manufacture of claim 12, wherein a plurality of dual loops couple the plurality of RAID arrays to the storage controller, wherein a selected first RAID array is preferred to be in a different dual loop than a selected second RAID array.

14. The article of manufacture of claim 12, wherein the predetermined selection rules used for selecting the RAID arrays are based on a weighting of the reliability and the performance of drive types of the plurality of RAID arrays, wherein if the first RAID array is better than the second RAID array based on the weighting, then the first RAID array is selected in preference to the second RAID array for storing the data redundantly.

15. The article of manufacture of claim 11, wherein while selecting the RAID arrays from the plurality of RAID arrays based on the predetermined selection rules:
- a rank detail state selection prioritization criterion is provided a higher priority in the predetermined selection rules than a dual loop separation selection prioritization criterion;
- the dual loop separation selection prioritization criterion is provided a higher priority in the predetermined selection rules than a rank drive type selection prioritization criterion; and
- the rank drive type selection prioritization criterion is provided a higher priority in the predetermined selection rules than a rank RAID type selection prioritization criterion.

16. A method for deploying computing infrastructure, comprising integrating computer-readable code into a computing system, wherein the code in combination with the computing system is capable of performing:
- maintaining a plurality of RAID arrays coupled to a storage controller;
- selecting RAID arrays from the plurality of RAID arrays based on predetermined selection rules; and
- storing data redundantly in the selected RAID arrays by writing the data to the selected RAID arrays, wherein if a first RAID array of the plurality of RAID arrays is in a better rank detail state than a second RAID array of the plurality of RAID arrays then the first RAID array is selected in preference to the second RAID array for storing the data redundantly, wherein good rank detail states are better than rebuilding rank detail states, wherein rebuilding rank detail states are better than exposed rank detail states, and wherein exposed rank detail states are better than degraded rank detail states.

17. The method for deploying computing infrastructure of claim 16, wherein the selecting of the RAID arrays from the plurality of RAID arrays further comprises:
- selecting three RAID arrays from the plurality of RAID arrays based on the predetermined selection rules, in response to determining that the plurality of RAID arrays has more than three RAID arrays.

18. The method for deploying computing infrastructure of claim 17, wherein a plurality of dual loops couple the plurality of RAID arrays to the storage controller, wherein a selected first RAID array is preferred to be in a different dual loop than a selected second RAID array.

19. The method for deploying computing infrastructure of claim 17, wherein the predetermined selection rules used for selecting the RAID arrays are based on a weighting of the reliability and the performance of drive types of the plurality of RAID arrays, wherein if the first RAID array is better than the second RAID array based on the weighting, then the first RAID array is selected in preference to the second RAID array for storing the data redundantly.

20. The method for deploying computing infrastructure of claim 16, wherein while selecting the RAID arrays from the plurality of RAID arrays based on the predetermined selection rules:
- a rank detail state selection prioritization criterion is provided a higher priority in the predetermined selection rules than a dual loop separation selection prioritization criterion;
- the dual loop separation selection prioritization criterion is provided a higher priority in the predetermined selection rules than a rank drive type selection prioritization criterion; and
- the rank drive type selection prioritization criterion is provided a higher priority in the predetermined selection rules than a rank RAID type selection prioritization criterion.

* * * * *